United States Patent [19]

Elstner et al.

[11] Patent Number: 5,047,923

[45] Date of Patent: Sep. 10, 1991

[54] MODULARLY STRUCTURED DIGITAL COMMUNICATION SYSTEM FOR INTERCONNECTING TERMINAL EQUIPMENT AND PUBLIC NETWORKS

[75] Inventors: Siegfried Elstner, Eichenau; Klaus Kuhlmann, Munich, both of Fed. Rep. of Germany

[73] Assignee: Siemens Aktiengesellschaft, Berlin and Munich, Fed. Rep. of Germany

[21] Appl. No.: 233,827

[22] Filed: Aug. 19, 1988

[30] Foreign Application Priority Data

Aug. 21, 1987 [DE] Fed. Rep. of Germany ....... 3727954
Jun. 13, 1988 [DE] Fed. Rep. of Germany ....... 3820072

[51] Int. Cl.⁵ .................... G06F 3/16; G06F 13/42; H04L 12/50; H04M 7/00
[52] U.S. Cl. .................... 364/200; 364/222.2; 364/222.3; 364/282.1; 364/229; 364/230.4; 364/240.8; 364/241.7; 364/242.94; 364/919.4; 364/927.96; 364/933.9; 364/935.4; 364/942.4; 364/942.5; 364/940.9; 364/940.81; 364/281.4; 364/281.7
[58] Field of Search .................... 364/200, 900

[56] References Cited

U.S. PATENT DOCUMENTS

| | | | |
|---|---|---|---|
| 4,228,496 | 10/1980 | Katzman et al. | 364/200 |
| 4,272,819 | 6/1981 | Katsumata et al. | 364/200 |
| 4,356,550 | 10/1982 | Katzman et al. | 364/200 |
| 4,385,382 | 5/1983 | Goss et al. | 364/200 |
| 4,471,427 | 9/1984 | Harris | 364/200 |
| 4,570,217 | 2/1986 | Allen et al. | 364/200 |

*Primary Examiner*—Archie E. Williams, Jr.
*Assistant Examiner*—Robert B. Harrell
*Attorney, Agent, or Firm*—Hill, Van Santen, Steadman & Simpson

[57] ABSTRACT

Modularly Structured Digital Communications System having Operations-Oriented Communication Means. The operations-oriented communication means are distributed in three structure levels such that operating technology apparatus program modules that are associated with types of terminal equipment are provided in a line technology task structure for generating logical operating technology status messages or for setting data for operating technology terminal equipment. A coordination program module for controlling the operations-oriented information and data flow is provided in a coordination task structure and at least one application program module for sequencing application-oriented functions is provided in an application task structure.

31 Claims, 12 Drawing Sheets

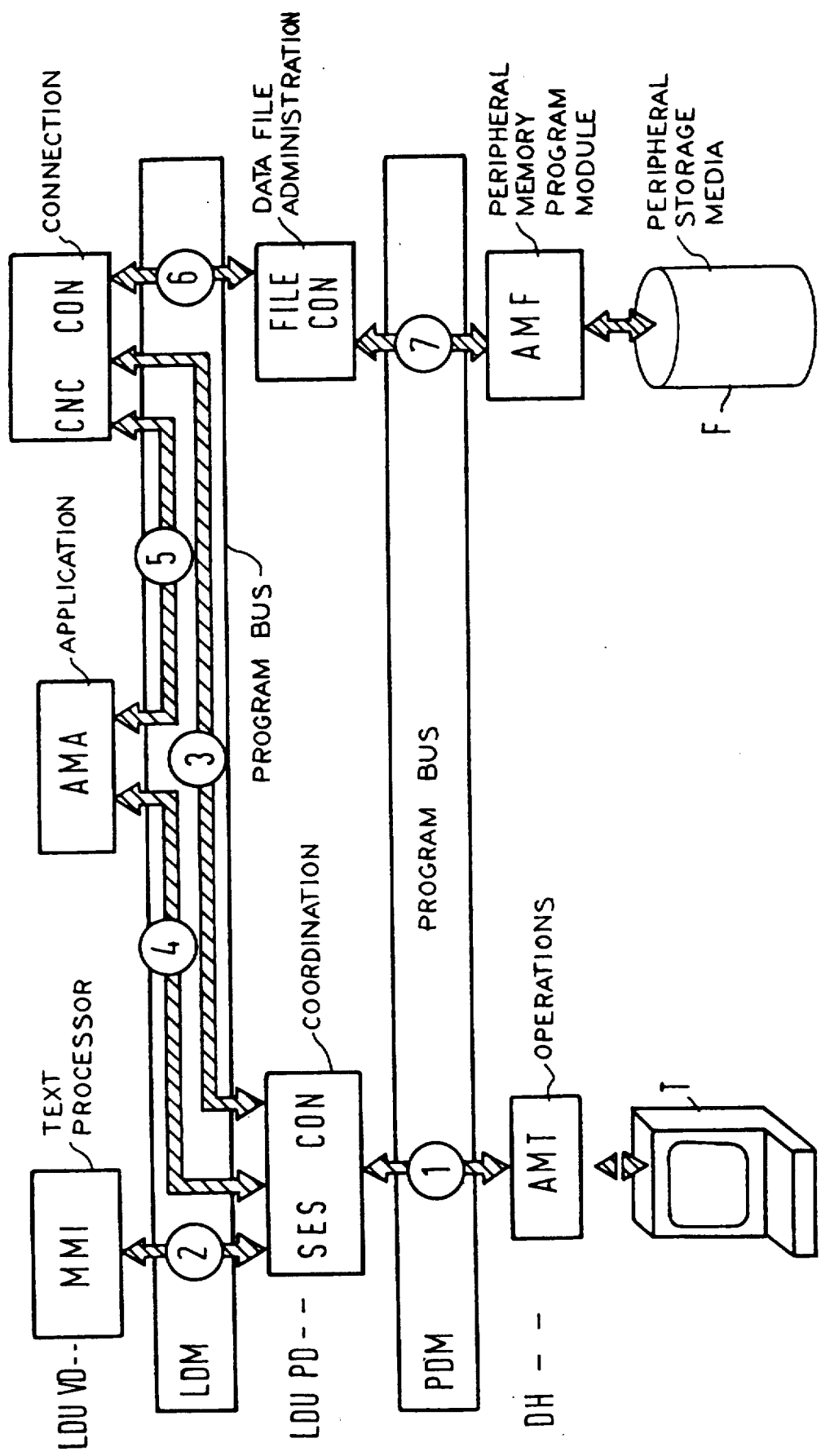

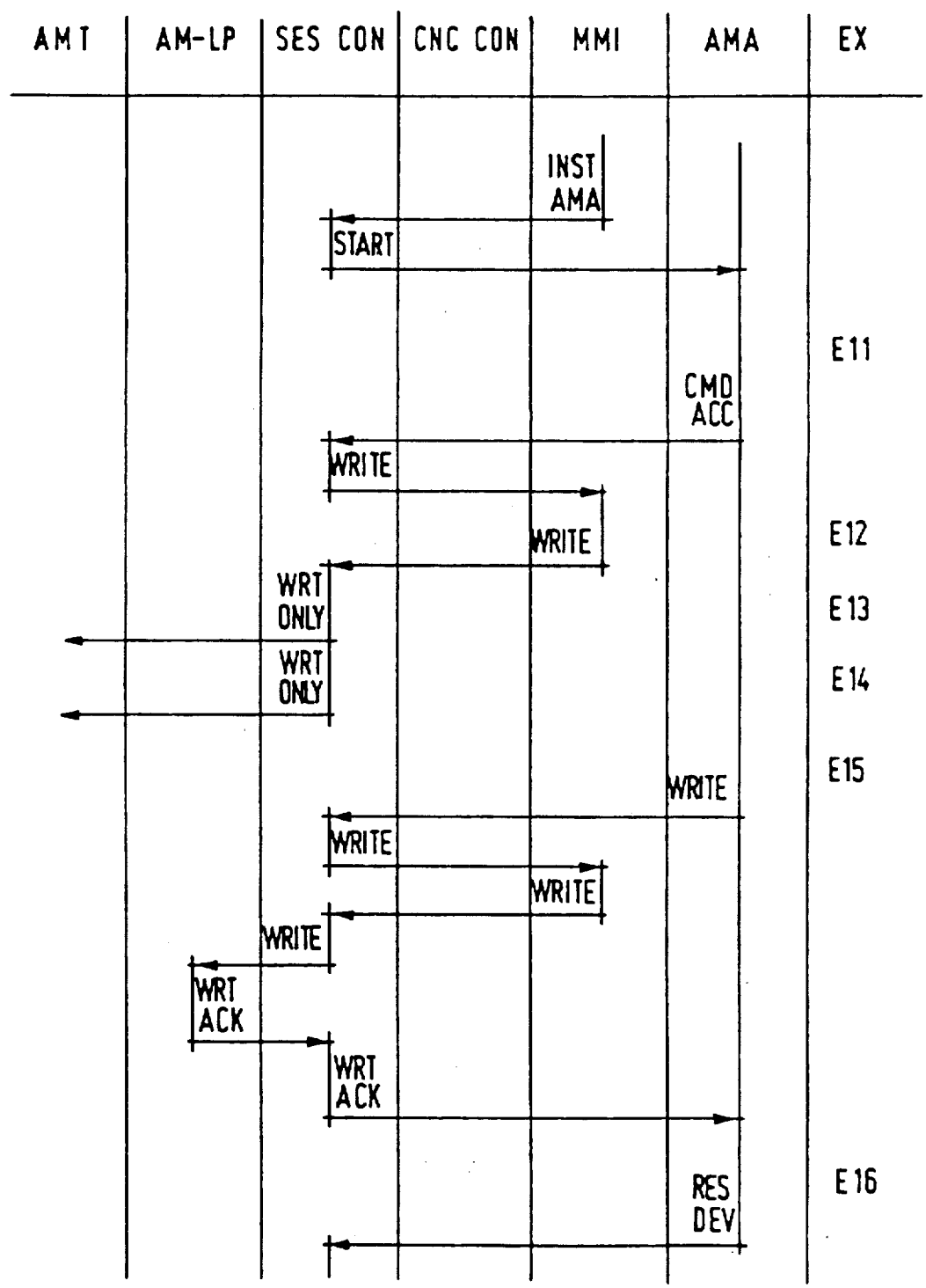

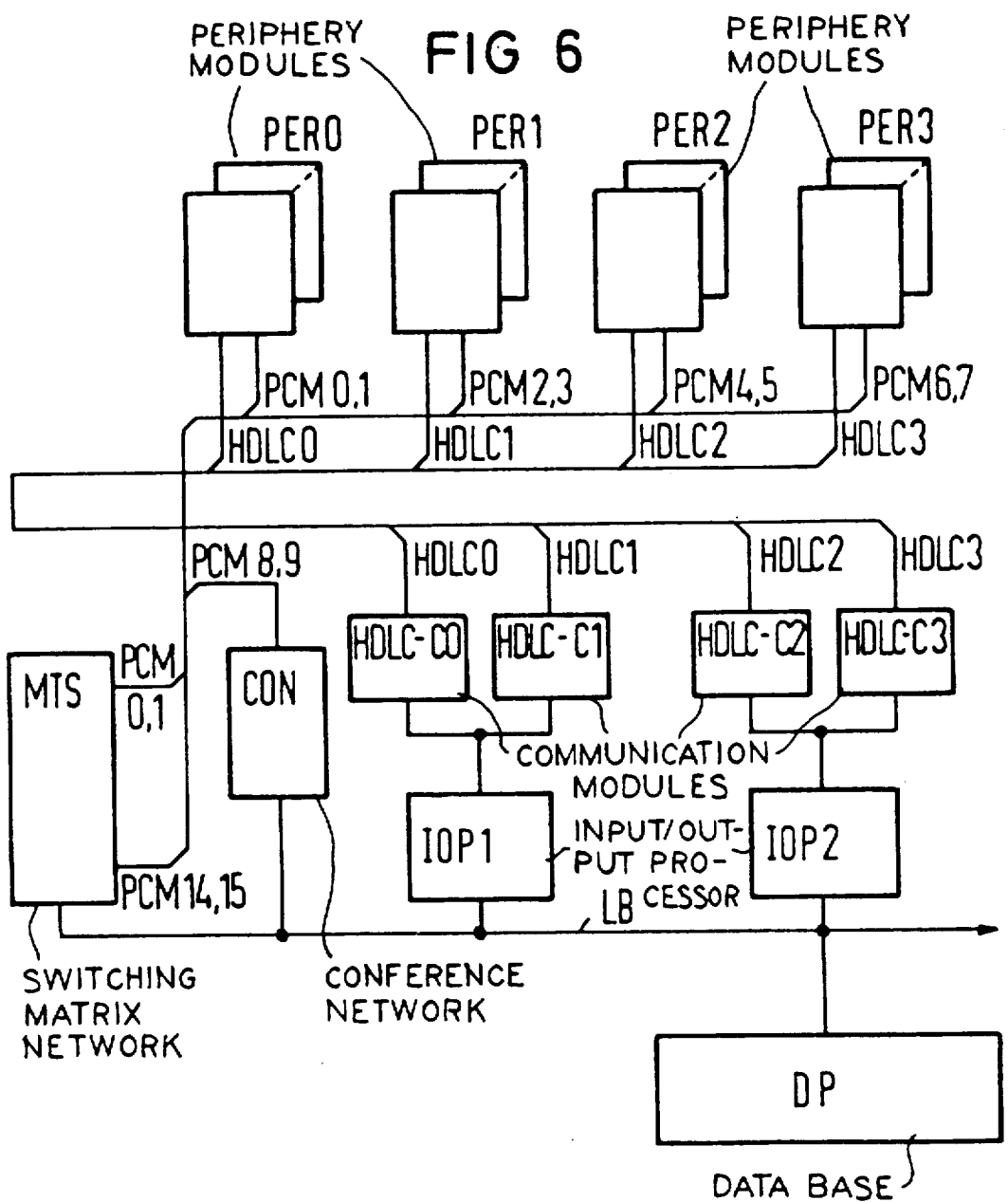

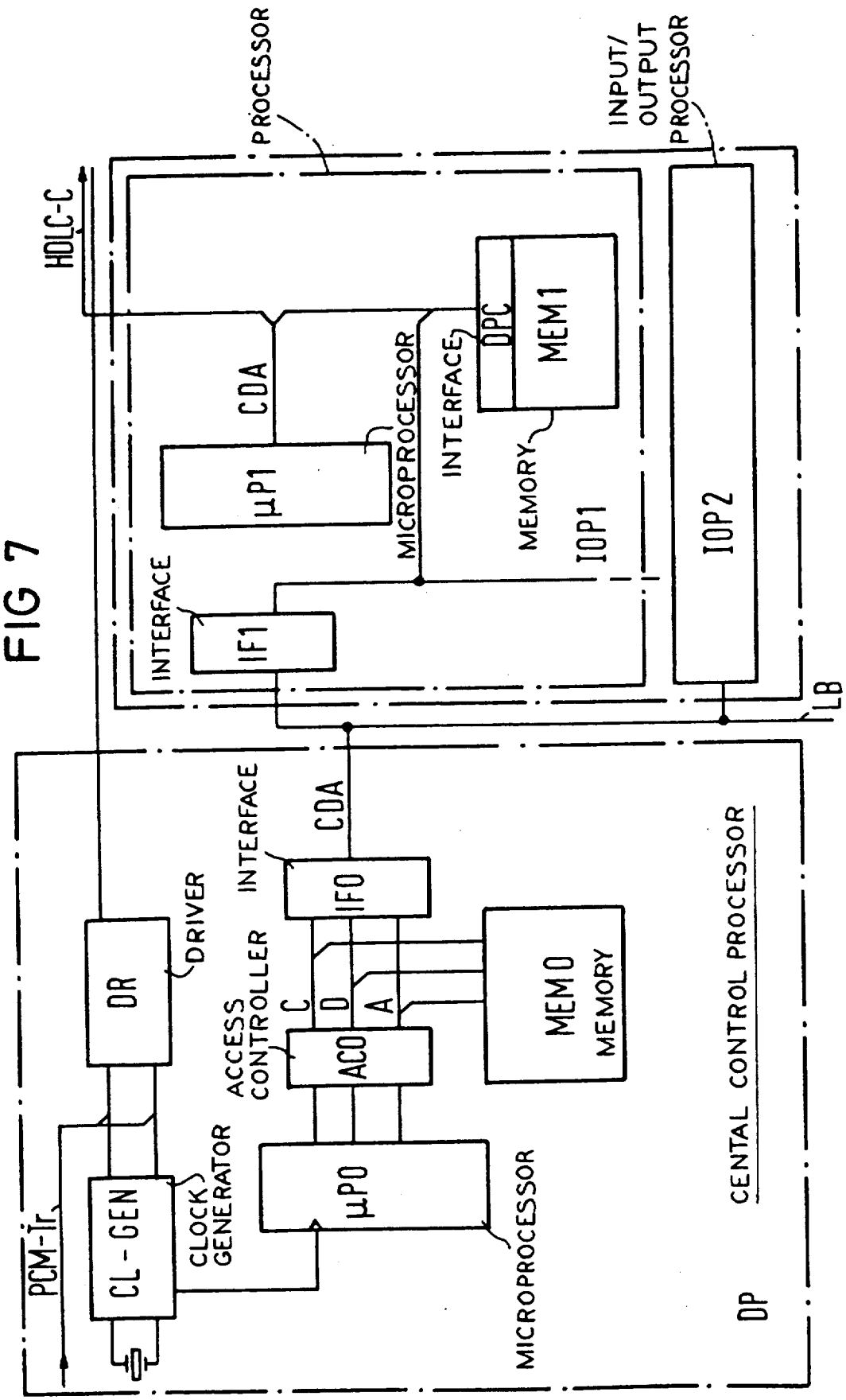

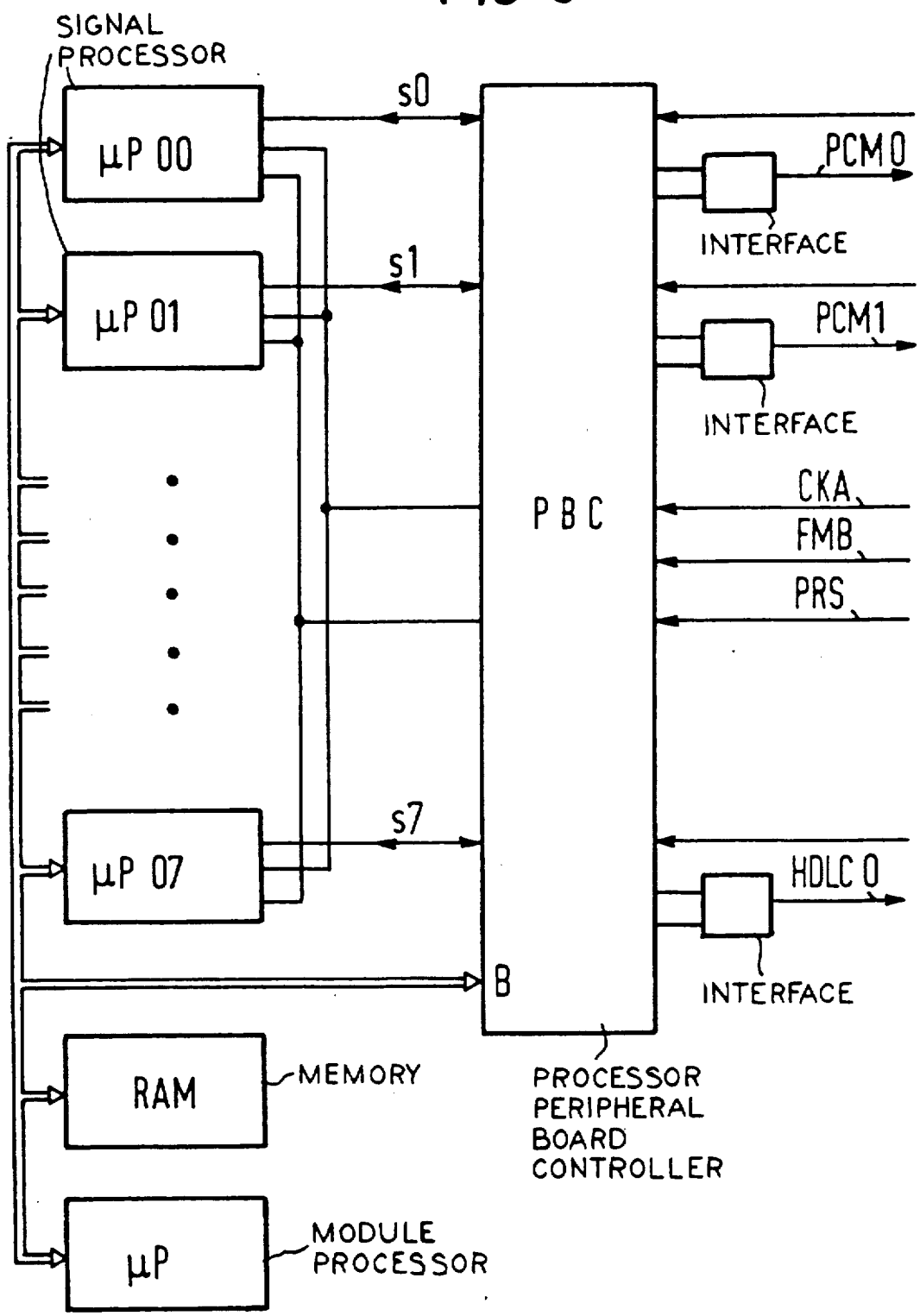

MODULARLY STRUCTURED DIGITAL COMMUNICATION SYSTEM FOR INTERCONNECTING TERMINAL EQUIPMENT AND PUBLIC NETWORKS

BACKGROUND OF THE INVENTION

Modularly structured digital communications systems serve the purpose of connecting terminal equipment usually having versatile performance features to one another and for connecting such terminal equipment to communications networks, particularly public networks. A special edition of "telcom report", ISDN in Buero, 1985, discloses such a communications system to which analog and digital telephones, telecopiers, multi-functional terminals, work stations, personal computers, teletex, screen text stations and data terminal equipment can be connected. The structure of the system is designed such that traditional devices having analog transmission can also be connected in addition to digital terminals, as well as, a networking with other communications systems. The essential component part of this communication system is a central communication computer having a system data base and at least one multi-tasking operating system. A "task" is herein defined as an independent execution unit that is composed of a runnable program as well as of its respective executive environment, for example memory occupation or apparatus allocation. At every point in time, each task has the status of "active", "waiting" or "quiescent". Tasks can be executed in parallel to one another by a multi-tasking operating system, whereby this can be performed both by means of a plurality of processors working independently of one another as well as by a single processor in a time-division multiplex method. Further critical properties of tasks are that they can communicate with one another by status reports and can mutually synchronize with one another.

The performance capability of such a digital communications system is critically determined by the software structure of the system. A known prior art communications system has a modularly structured software architecture whose critical component parts are, first, the multi-tasking operating system or the data base and, second, the actual switching software composed of the periphery software, of the line-technology software and of the exchange-oriented connecting software. The allocation of sub-functions of the control software to individual software modules or the overall software structure of the known communications system are adapted to the system size of several hundred through several thousand connections.

The performance and the usefulness of such a communications system are critically dependent on the ability to organize and maintain the system that, in addition to other aspects, are subsumed under the term operating technology. The organizability of the system should be able to handle individual user requests with respect to system expansion, numbering plan, device and communications service multiplicity in a fast simple reliable and user-friendly way. The most important functions of maintenance are, for example, manual switch requests for inhibiting, unlocking and switching system units, manual check requests, execution tracking and diagnosis acquisition as well as providing clear-text output for the system operator. The prerequisite for the organizability and maintainability of the system is an all-encompassing "administration" of the communications system. Included in this "administration" are data storage generation and regeneration, storing and maintaining the customer data for system configuration, communications services and terminal equipment as well as traffic measurements.

SUMMARY OF THE INVENTION

An object of the present invention is to provide a control and organization structure for the execution of all operations-oriented tasks, and in particular an optimum adaptation of this control and organization structure to a defined, switching-oriented control and organization structure of a digital communications system. For this modularly structured digital communications system, device program modules are arranged in a line technology task. These device program modules control the signalling procedures and the user interface of the terminal equipment associated with a type of terminal equipment. Signal output by the terminal equipment are converted into logical reports for the communications computer by system-associated parameters and logic reports of the communications computer are converted into setting data for the terminal equipment. In a switching technology task representing a second structure level, switching procedure program modules are provided that are structured independently of the class of terminal equipment and independent of communication services in the sense of forming logical sub-processes of the overall switching process. The multi-tasking operating system of the communications computer has a program bus structure having a transmission protocol for the messages transmitted thereover that is defined with universal validity independently of the communications services and the type of terminal equipment, in the sense of a logical network mode for connecting the switching procedure program modules to the apparatus program modules.

This organization and control structure of the communications system has the significant advantage that such a communications system in an arbitrary initial equipment can be expanded later at any time with additional types of terminal equipment and additional communications services without having to alter the basic structure of the modularly structured communications system. When new types of terminal equipment or new communications services are added, a corresponding apparatus program module is merely inserted into the line technology task, whereas the remaining structure components, i.e. particularly the switching technology task, remain unaffected. This is essentially due to the fact that the dependencies of communications services and types of terminal equipment have been placed only into the domain of the line technology task or of the data base, so that the switching technology task can be designed for an exclusive connection handler independently of the terminal equipment to be connected to one another and of the communications services used by these.

The optimum adaptation of an operations-oriented organization and control structure to such a communications system of the present invention is achieved by a modularly structured digital communications system for connecting terminal equipment to one another and, in particular, to public networks and having a central system computer having a system data base and at least one multi-tasking operating system for the administration of a line technology task structure having operating technology device program modules associated with the type of terminal equipment for generating logical operating technology reports from inputs occurring at the terminal equipment and/or operations-oriented terminal equipment and for outputting setting data for the terminal equipment and/or operations-oriented terminal equipment acquired from logical operations-oriented reports associated with the type of terminal equipment, and for the administration of an operations-oriented coordination task structure hierarchically equivalent to a switching technology task structure, the system having a coordination program module hierarchically lower-ranking than a coordination task organization program for the control of the operations-oriented information and data flow, and for the administration of an operations-oriented application task structure having at least one application program module hierarchically lower-ranking than an application task organization program for sequencing applications-oriented functions, for example initialization, maintenance, remote control technology, whereby at least one part of the program modules are accessible to the data base in individual fashion via defined data base access routines, the multi-tasking operating system has a program bus structure having a transmission protocol, a virtual terminal protocol, defined independently of the communication service and the type of terminal equipment for reports transmitted between the line technology task structure and the coordination task structure and has a further transmission protocol, a virtual application protocol, that is also defined independently of the communications services and the type of terminal equipment and that provides a compact data arrangement that is at least approximately free of control characters, for reports transmitted within the application task structure and between this application task structure and the coordination task structure; and has a test processor program module for conversion of reports in one of the two transmission protocols into reports in the other transmission protocol.

The organization and control structure of the present invention is thus essentially based on the execution of all apparatus-associated function executions within the framework of operations-oriented requests in operations-oriented device program modules, i.e. in the creation of device-independent, virtual interfaces as well as, first, in the control and realization of all functional executions for the operations-oriented information and data flow in the coordination program module and, second, of the sequencing of all applications-oriented jobs in the application program modules. These structure features are augmented by the use of standardized mechanisms between the individual task structure levels upon use of two defined transmission protocols and of a text processor program module that, among other things, has the function of protocol conversion.

The structure of the communications system of the present invention provides a pronounced, strict modularity for the implementation of operations-oriented components in the sense that communications systems can customized without adaptations outside of the actual modules. A later addition of new types of terminal equipment, of new performance features of such terminal equipment or the addition of new communications services with existing or new terminal equipment can be governed with respect to the operating technology of the overall communications system by adding new modules, particularly application program modules. The communications system of the present invention thus offers a pronounced adaptability to an extensive or modified performance scope without influencing the actual system structure or of the system structure strategy underlying this system structure. Three fundamentally different data formats for communication among the operations-oriented communication means are used within the operations-oriented organization and control structure of the system operating technology. In addition to the virtual terminal protocol and the virtual application protocol, a man-machine translator protocol is also present for the text processor program module.

The virtual terminal protocol is composed of a sequence of control information and data information that relieve one another, whereby the data information are composed of standard string elements, preferably in the ASCII format, and the control information contain logical control criteria for the input and output of such string elements (for example, positioning instructions, imaging attributes and field allocation criteria). The virtual terminal protocol serves as data interface of a virtual terminal, representing every terminal from and to the system. Many types of input and output equipment can thus be accommodated, particularly telephone terminal equipment for the initiation of operations-oriented jobs and the associated dialog as well. However, the physical pre-requisite of a picture screen that is nearly indispensible for operations-oriented jobs is provided in only a few cases. As a solution, appropriate operating technology apparatus program modules associated with that type of terminal equipment simulate a picture screen function, for example by a window technique or "scrolling", by an expanded use of input and output possibilities, for example displays.

In order to be able to transmit the information in the virtual terminal protocol as efficiently as possible, an advantageous development of the present invention provides that only data modified in comparison to a status on which a preceding report is based are transmitted in the reports in the virtual terminal protocol. For a transmission of such modified data, however, a distinction must be made between the re-definition of an output structure (mask) and the introduction of "delta data" into this mask. In the definition of an output structure, the modified data modify the field formating; otherwise, they only modify the field content.

The reports in the virtual terminal protocol, just like the reports in the virtual application protocol, are preferably constructed such that a system data head part having a defined sequence of report originating and destination addresses is followed by a data head part associated with the operations technology and having protocol identification information different for the two protocols, having a designation of a job session to which the respective report belongs, and having a destination address identifying the application program module required for running the job session.

In particular, the data between the text processor program module and the applications program modules are exchanged via the virtual applications protocol. The data transmitted in this protocol are already checked according to syntax and are preferably companded. The recited parameters are entered in close proximity so that the entire protocol need not be forwarded for transmission to a different program module. The information transmitted in the virtual application protocol thus have a smaller scope than the data transferred in the virtual terminal protocol, since all control characters are contained in the latter. The virtual application protocol is preferably defined independent of language, so that, for example, inputs in a different language, can occur as appropriate outputs. A simple adaptation, for example, a modification from session to session, is possible by using text tables having different languages. Insofar as the text processor program module is inserted into operations-oriented terminal equipment such as a personal computer, as provided in an advantageous improvement of the invention, the data tables for the individual applications being stored therein, these being involved in running the operations-oriented jobs by a system program of the operations-oriented terminal equipment structured functionally like the coordination program module, there is the possibility of managing with relatively small information scope for terminal equipment equipped in this way conditioned by the special properties of the virtual application protocol. The operating system and the transport control of the software bus structure of the communications system are thereby less complex. A significant reduction of the storage capacity of the communications system results by rolling the application tables out to the personal computer. The check of a parameter against the data base which may be needed continues to occur in the system by the corresponding application program module that continues to be present therein. Also, when the functions of the text processor program module and of the coordination program module are present in a peripheral personal computer, the corresponding program modules remain within the task structure levels provided in the framework of the present invention. The coordination program module, however, then represents an exclusive transfer module for such data to the application program modules for the remaining data traffic, in the virtual application protocol.

The text processor program module can also be inserted into the operations-oriented application task structure independently of the provision of a corresponding capability of the protocol conversion in an operations-oriented terminal equipment. The text processor program module is thus considered to be an application program module in the broader sense and provides for the conversion of instruction information, for example according to CCITT man-machine-language, into application-suited data information. The text processor program module also supplies the logical control criteria required for the user dialoging, whereby both "line" as well as mask-oriented methods are used for the user dialoging. Further sub-functions of the text processor program module, already set forth in part, are the syntax checking, the analysis of instructions corresponding to parameter tree definitions (parsing), the execution of individual parameter checks against application-related data tables, and the editing of output texts.

All operations-oriented accesses onto the communications system are controlled via the coordination program module, whereby the operations-oriented execution preferably occurs session-oriented in order to guarantee the exclusive use of the data-oriented connection for the user. The set-up, the chronological monitoring and the terminating of a session are accordingly controlled by the coordination program module. Interrelated thereto, the coordination program module administers internal memory resources for the respective session.

According to an advantageous development of the present invention, the coordination program module is assigned a central position within the control executions of the operations-oriented information and data flow insofar as it is structured such that it initiates the selection of the corresponding application program modules dependent on the type of applications addressed within an operations-oriented job.

Further events controlled by the coordination program module are unsolicited data outputs without reservation on an output terminal equipment, coherent data outputs with absolute or conditioned reservation of an output terminal equipment and prioritized data outputs, with the possibility of interrupt of conditioned reservation in the presence of prioritized data output.

For the presence of data, particularly application tables in peripheral data files, the coordination program module can be supplemented or supported by a data file administration program module for controlling the access to peripheral data files inserted into the operations-oriented coordination task structure. This data file administration program module is hierarchically lower-ranking than a data file administration task organization program. In such cases the fundamental organization and control structure of the communications system of the present invention is retained in that a memory program module for the control of search, read and write requests for the memories accepting the data files is inserted into the line technology task structure. The memory program module can be structured such that it constructs and dismantles waiting lists for such requests initiated by the data file administration program module.

A further advantageous development of the present invention is based on the capability of driving the different application program modules of the coordination program module and provides in this context that an application connection program module for setting up and for administering the connection of the coordination program module to one of the application program modules is inserted into the operations-oriented application task structure, this application connection program module being hierarchically lower-ranking than a application connection task organization program. The check for the presence of defined, addressed application program modules in the operations-oriented application task structure and, as warranted, the loading of such application tables from peripheral data files into the application task structure upon involvement of the data file administration program module and of the memory program module are then preferably inserted into the application connection program module.

The collaboration of the coordination program module and of the application connection program module preferably occurs such that the data input by an operations technology terminal equipment and edited by an appertaining operations technology apparatus program module are forwarded from the coordination program module to the text processor program module for checking which application program module is required for further processing. A status message dependent on the result of this check is then output to the application connection program module that sets up a connection of the coordination program module to the required application program module via which the coordination program module outputs the request data converted by the text processor program module to the application program module in the virtual application protocol. This application program module, after running the application-associated procedures, in turn transfers the procedure results to the coordination program module in the virtual application protocol.

The application program modules introduced into the operations-oriented application task structure are system components for implementing the individual jobs for the initialization maintenance and administration of the communications system as well as for the compilation of system status data for the data output and system care. Every application program module has a defined function scope, whereby the definition of the individual application program modules occurs such that a great variety of different, complex, operations-oriented jobs can be processed on the basis of successive call-in of the individual application program modules. Fundamentally, the application program modules can be divided into four different application categories:

1. Standard Applications

These are applications that relate to the data base of the communications system. For example, system-associated data such as authorizations or numbering plan, can be established or modified with the assistance of such applications. The access to the data base is via the defined data base access routines.

2. System Applications

The basis for these applications are the operations-oriented, session-oriented data. With the assistance of these applications, for example, masks for defined output formats can be defined or a storing of active operations-oriented background procedures or a call-in or an interrupt thereof can occur.

3. Background Applications

Such background applications, for example, provide for the acceptance of data of an ongoing operations-oriented job in order, for example, to release an operations technology terminal equipment for further inputs even before the ongoing operations-oriented event is completely terminated.

4. Permanent Applications

Independent output activities, for example, alarm outputs at alarm fields, can be implemented with these applications without the cooperation of the coordination program module, these applications being preferably organized as an autonomous task.

With respect to the structure of the individual components of the modularly structured communications system, an advantageous development of the present invention provides that the operations technology apparatus program modules allocated to the terminal equipment and to the operations technology terminal equipment have a pre-processing program level that evaluates the signal output by the terminal equipment o operations technology terminal equipment based on individual line criteria and converts status messages from the operations-oriented task structure into setting data for the terminal equipment or operations technology terminal equipment and have an evaluation program level that converts the stimuli into protocol-suited status messages based on system-associated parameters. For the employment of ISDN terminal equipment and specific operations technology terminal equipment with which logical signals can generally be generated, the use of system-internal parameters for the evaluation of the logical signals can be eliminated. In such cases, the evaluation program level can be considered as a logical zero function. Expediently, the operations technology terminal equipment have an operations technology apparatus program module specifically customized for the type of terminal equipment allocated to them, this operations technology apparatus program module forming a virtual interface only for the operations-associated information and data flow. In contrast thereto, the operations technology apparatus program modules allocated to the actual exchange-oriented terminal equipment can represent a sub-module of an apparatus program module associated with the type of terminal equipment and having at least one further sub-module for processing communications-oriented signals and status messages, whereby an allocation program resident in the evaluation program level branches status messages and information onto the two submodules dependent on function. The pre-processing program level can thereby be used for both sub-modules.

Placing the line technology task structure into the overall communications system o particularly connecting the line technology task structure to the actual periphery preferably occurs such that a periphery memory administered by an input/output processor has a respective input terminal for the status messages for the terminal equipment or for the operations technology terminal equipment that are acquired in the line technology task and a respective output terminal for status messages acquired from signals of the terminal equipment or of the operations technology terminal equipment, these input and output terminals being controllable independently of one another.

In order to obtain an optimally uniform structure for the transport functions between the individual structure levels of the communications system, the input terminal as well as the output terminal each have a transfer memory operated mail boxlike and allocated to them with which the operations technology apparatus program modules of the line technology task are linked and, over and above this, the communication of status messages between the individual structure levels and, in part, within the structure levels as well generally occur as a result of at least one input and output memory operated mail box-like for every task within the line technology task structure, the operations-oriented coordination task structure and the operations-oriented application task structure.

In the same way as the communication of status messages between the line technology task structure and the exchange-oriented task structure, the communication of the signals initiated by the terminal equipment to the operations technology apparatus program modules accordingly occurs in a transport slice of a status message protocol of the multi-tasking operating system and this can be facilitated in system-oriented terms in that the input/output processor is equipped with an operating system identical to the multi-tasking operating system, To be viewed overall as significant advantages of the present invention in its basic structure or in its structure expansions are that the operations technology apparatus program modules are associated with the type of terminal equipment and that transfer protocols are defined universally valid independent of type of communications service and terminal equipment are provided for the operations-oriented status messages communicated via the program bus structure of the multi-tasking operating system. The significant advantage is that the operations-oriented information and data flow of such a digital communications system having an arbitrary initial configuration can be adapted at any time later to additional types of terminal equipment and communications services by inserting appropriate program modules into the line technology task structure and/or into the application task structure. Overall, the communications system of the present invention provides a simple adaptation of an operations-oriented data and information flow structure to any change in a fundamental configuration of a specific, modularly structured digital communications system, for example for an increase in subscribers, an increase in performance features and expansion in the types of terminal equipment. All increases and expansions are thus also inserted in the domain of the operations-oriented organization and control structure by additional operations technology apparatus program modules and application program modules.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

FIG. 4 is a diagram of an information and data flow within the operations-oriented organization and control structure during the execution of an operations-oriented job;

FIGS. 5a, 5b, 5c, 5d, 5e depict a graphic overview of the status message flow between the individual program modules of the digital communications system during the execution of operations-oriented jobs;

FIG. 6 is a diagram of a hardware architecture representing the basis for the organization and control structure of FIG. 1 in a communications system having peripheral modules for a total of 64 subscriber or line terminals;

FIG. 7 is a diagram of a schematic view of the central control processor contained in the hardware architecture and of an input/output processor; and FIG. 8 is a diagram of a schematic view of a peripheral module having equipment for supplying the communications system with call progress tones and for receiving and for sending selection signals.

DESCRIPTION OF THE PREFERRED EMBODIMENT

Figure 1:
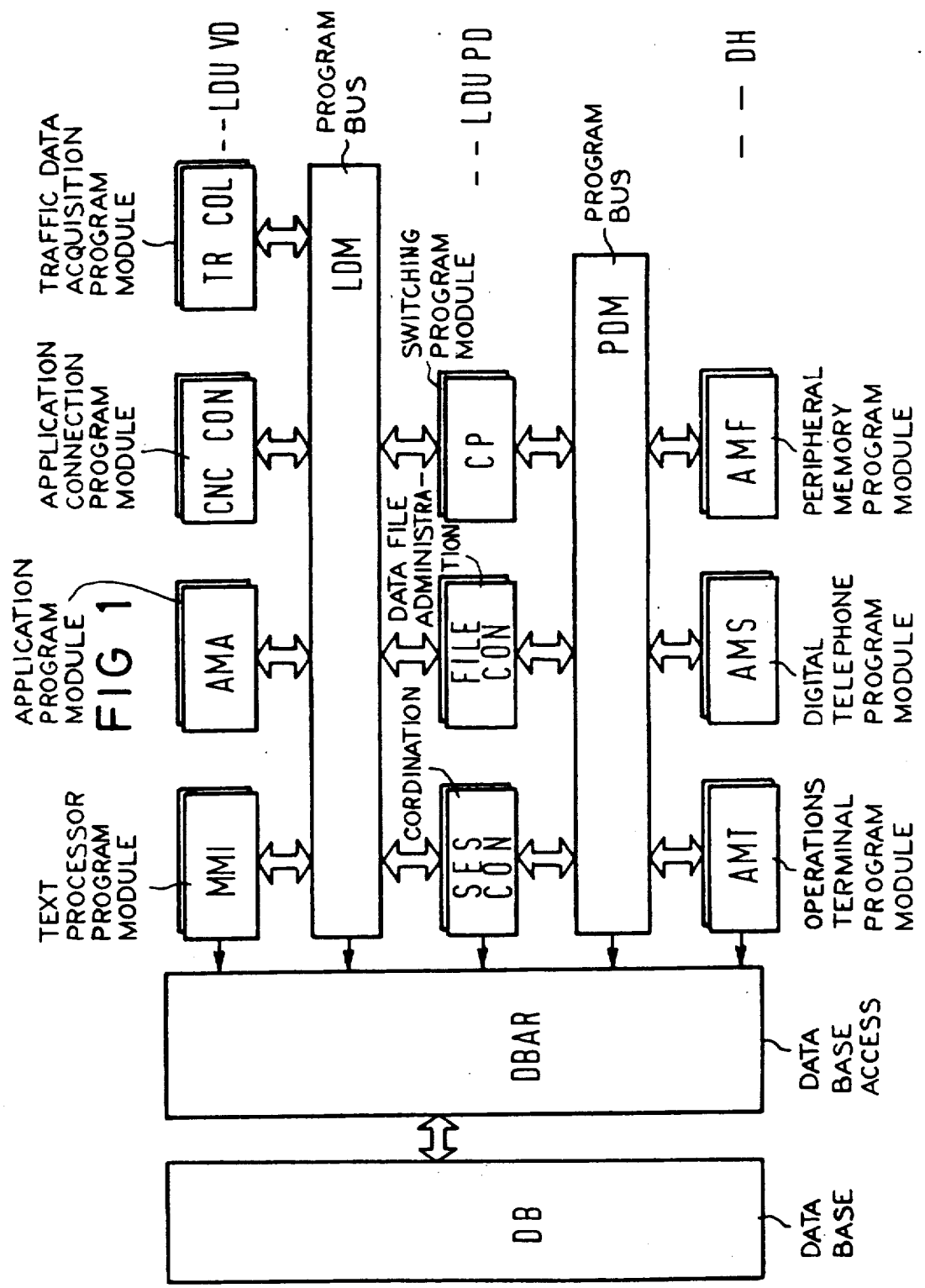
FIG. 1 is a diagram of an organization and control structure for the operations-oriented information and data flow of a digital communications system.

The organization and control structure for the operations-oriented data and information flow within a modularly structured communications system shown in FIG. 1 has three control levels each having a task structure DH, LDU PD, LDU VD between which status messages are exchanged via a program bus structure PDM, LDM. Three respective operations technology apparatus program modules AMT, AMS, AMF associated with the type of terminal equipment are located in the periphery-proximate line technology task structure DH, the first module AMT having an operations-oriented terminal, the second module AMS having a digital telephone terminal equipment and the third module AMF having a peripheral memory allocated to it. The exchange of status messages between the operations technology apparatus program modules AMT, AMS, AMF and the following operations-oriented coordination task structure LDU PD occurs in a defined transmission protocol, a virtual terminal protocol, via a program bus PDM of the program bus structure PDM, LDM. The operations-oriented coordination task structure LDU PD is hierarchically equivalent to a switching technology task structure, represented in FIG. 1 by a switching technology program module CP. The functionally most important component part of the operations-oriented coordination task structure LDU PD is a coordination program module SES CON via which the data and information flow essentially proceeds and is controlled.

A data file administration program module FILE CON that is also located in the operations-oriented coordination task structure LDU PD provides for controlling access of program modules of the operations-oriented application task structure LDU VD to peripheral data files.

A single such application program module AMA is shown in the operations-oriented application task structure LDU VD as a representative of what is generally a greater plurality of application program modules. This application program module AMA, like other, further application program modules that are not shown, provides for sequencing operations-oriented jobs in conjunction with the initialization, the maintenance and the administration of the digital communications system. In a broader sense, a traffic data acquisition program module TR COL is considered to be an application program module. The traffic data acquisition program module TR COL provides for the acquisition of connection information related to subscriber or communications service, whereby the necessary connection information from the switching technology program module inserted into the switching technology task structure are fowarded via the program bus LDM of the program bus structure PDM, LDM in the form of status messages of a status message protocol associated with a switching technology.

A further, critical component part of the operations-oriented application task structure LDU VD is a text processor program module MMI that supplies the logical control criteria required for user dialoging. The critical job of the text processor program module MMI is the conversion of status messages in the virtual terminal protocol into status messages of a virtual application protocol and vice versa. Whereas the virtual terminal protocol is used for status messages between the line technology task structure DH and the operations-oriented coordination task structure LDU PD as well as for status messages from the coordination program module CS CON to the text processor program module MMI, all status messages, with the exception of status messages converted from the virtual application protocol into the virtual terminal protocol, from the text processor program module MMI to the coordination program module SES CON are transmitted in the virtual application protocol that is distinguished from the virtual terminal protocol by a compressed data sequence and thus a shorter length.

An application connection program module CNC CON is also located in the operations-oriented application task structure LDU VD, this serving for the set-up and for the administration of the connection of the coordination program module SES CON to one of the application program modules AMA. Over and above this, the application connection program module CNC CON also participates in the re-loading of data from peripheral memories via the data administration program module FILE CON.

At least a large part of the program modules from all three task structures DH, LDU PD, LDU VD has access to a data base DB of the communications system via defined data base access routines DBAR. The access of the individual program modules during the execution of operations-oriented events occurs in a transport level of a multi-tasking operating system of a central communications computer (not shown) that is realized by a multiprocessor configuration.

The organization and control structure for the operations-oriented data and information flow that has been set forth above is largely independent of the hardware structure of the communications system, i.e. known embodiments of centrally controlled communications systems can be utilized, for example the system HICOM described in the special edition of telcom report and in the Siemens magazine "COM-ISDN in the Office", 1984. FIGS. 6 through 8 show a further, hardware embodiment of the communications system.

Figure 2:
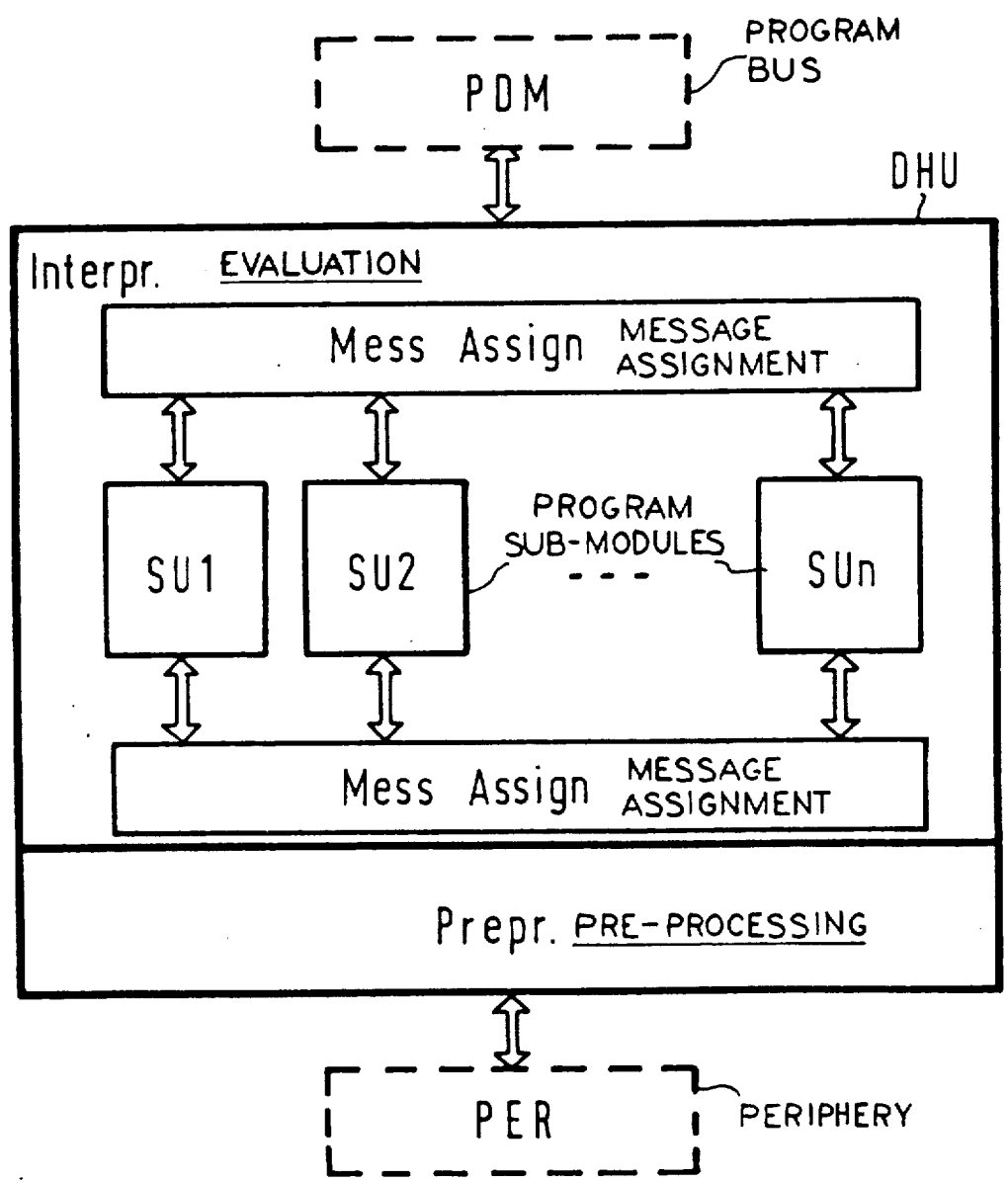
FIG. 2 is a diagram of a structure of an operations technology apparatus program module of the line technology task structure level.

FIG. 2 shows the fundamental organization and control structure of a line technology program module DHU. This organization and control structure essentially encompasses an evaluation program level Interpr and a pre-processing program level Prepr. In the pre-processing program level Prepr, signals from the periphery PER are evaluated according to individual line criteria and are output to the evaluation program level Interpr in an appropriately edited form. Over and above this, the pre-processing program level Prepr converts logical status messages that are transmitted to the line technology program module DHU via the software bus PDM into setting data for apparatus located in the periphery PER. The status messages forwarded to the line technology program module DHU can also be additionally evaluated and converted in the evaluation program level Interpr before processing in the pre-processing program level Prepr. Essentially, however, the evaluation program level Interpr converts the signal output by the periphery PER, in part after prior handling in the pre-processing program level Prepr, into logical status messages, whereby the formation of these logical status messages results from system-associated parameters that at least partially reside in the data base of the communications system.

The evaluation program level Interpr has program sub-modules SU1, SU . . . SUn that are each allocated to defined sub-functions of the overall function executable by the line technology program module DHU. In the present example, the program sub-modules SU1, SU2 are respectively allocated to switching-oriented sub-functions in the control of the signalling procedure and of the user interface of the terminal equipment of the periphery PER, whereas the program sub-module SUn is provided for the operations-oriented information and data flow for the type of terminal equipment to which the line technology apparatus program module is allocated. The program sub-module SUn, accordingly, is equated with the operations-oriented apparatus program module for digital telephone terminal equipment AMS in the illustration of FIG. 1 with respect to its function and its position in the overall organization and control structure of the communications system.

The allocation of the signal or status messages from the software bus PDM or from the periphery PER to the individual program sub-modules SU1, SU2 . . . SUn occurs by an appropriately designed allocation program Mess Assign (message assignment) in the evaluation program level Interpr.

Figure 3:
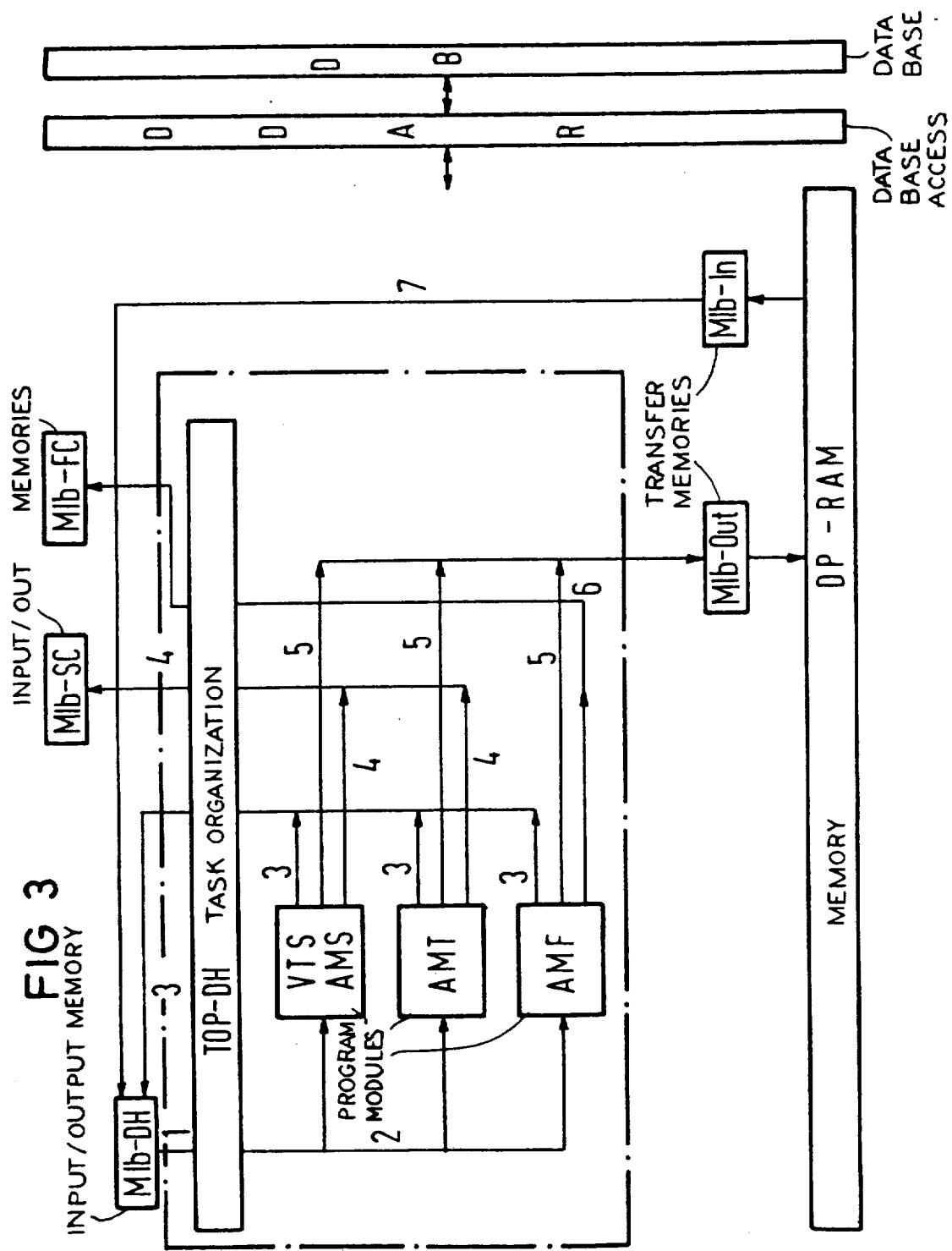
FIG. 3 is a diagram of a line technology task contained in FIG. 1 having apparatus program modules for adaptation to different types of terminal equipment, shown in a more detailed illustration.
Figure 5A:
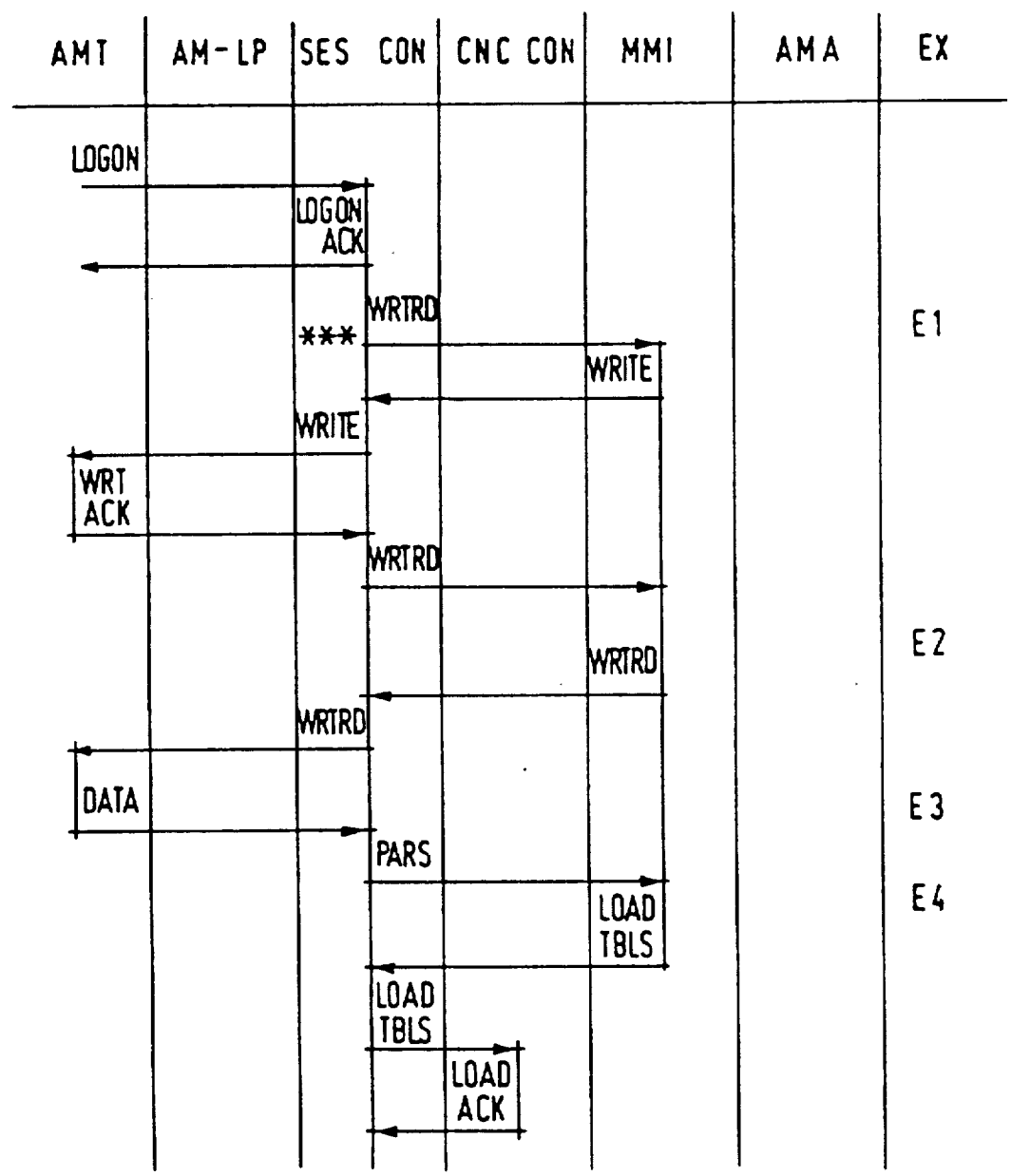
Figure 5B:
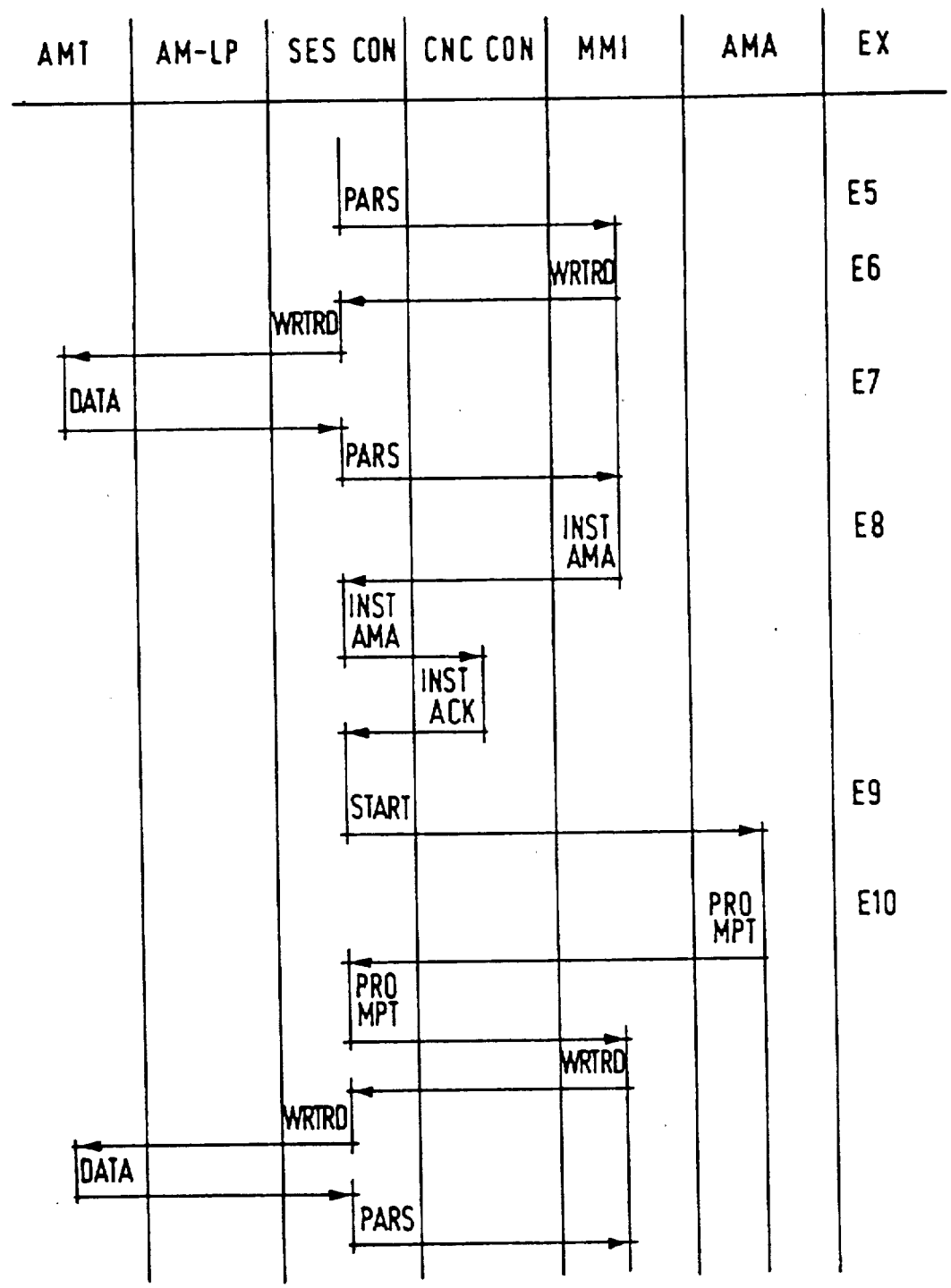
Figure 5D:
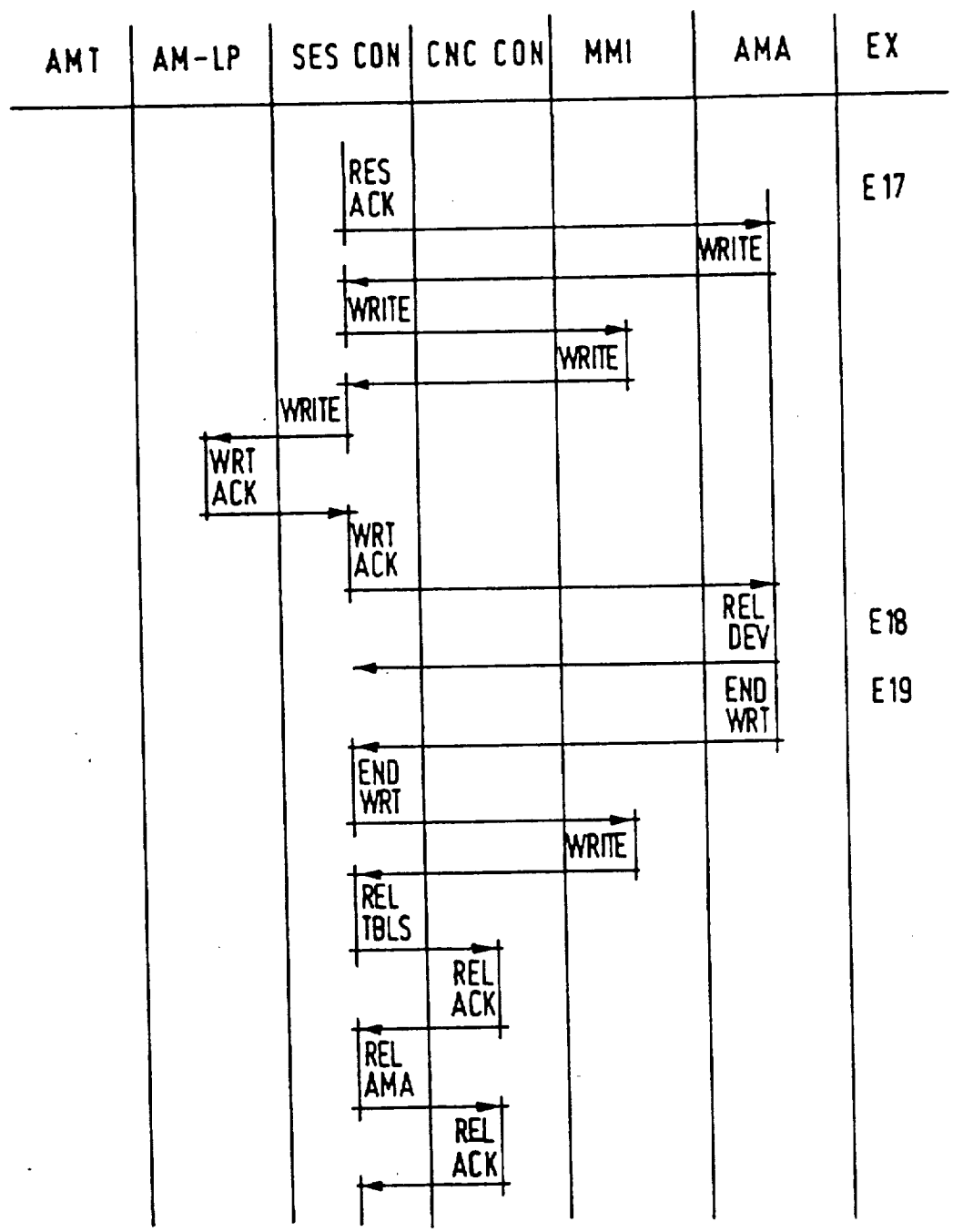
Figure 5E:
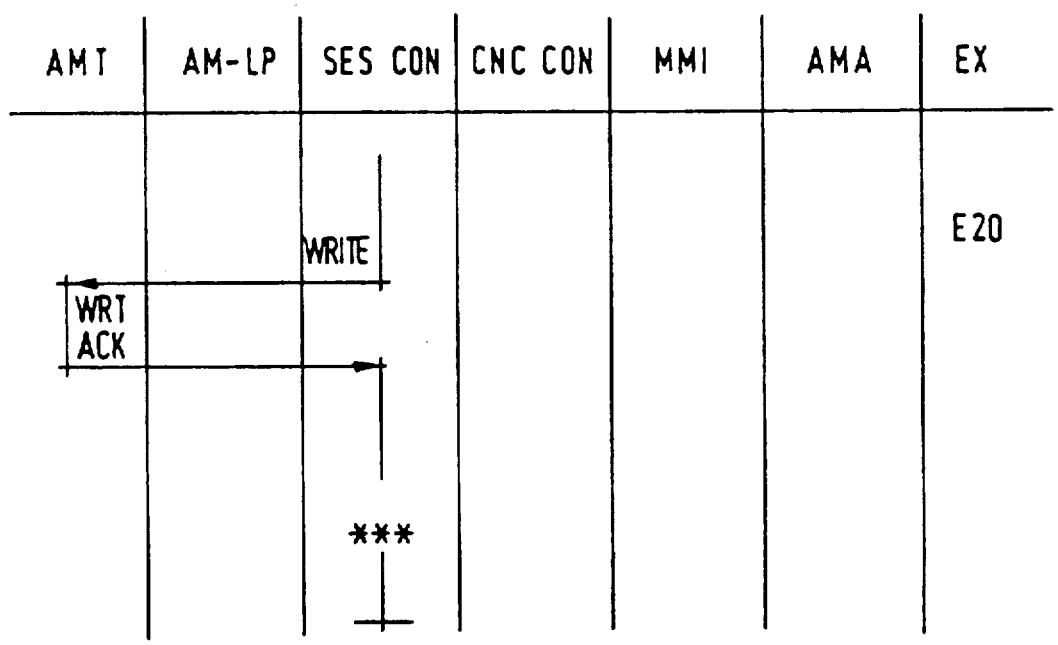

FIG. 3 shows the line technology structure level in its system environment The line technology structure level is essentially formed by a line technology task DH-T in which operations technology apparatus program modules AMF, AMT, AMS are hierarchically subordinated to a line technology task organization program TOP-DH. The operations technology apparatus program module AMT is allocated to an operations terminal and the operations technology apparatus program module AMF is allocated to a periphery memory. The operations technology apparatus program module AMS represents a sub-module allocated to the operations-oriented jobs in an apparatus program module that is augmented by a further sub-module VTS allocated to the switching-oriented jobs. Both sub-modules AMS, VTS are allocated to a digital telephone terminal equipment of the periphery.

In the direction toward the periphery of the communications system, the line technology task DH-T cooperates with a memory DP-RAM of an input/output processor. The communication of signals to the line technology task DH-T or of setting data to the peripheral equipment occurs via transfer memories Mlb-In, Mlb-Out operated mail box-like that are considered to be an integral component part of the transport level for signal and setting data. The transport level is augmented by an input and output memory Mlb-DH operated mail box-like via which the line technology task DH-T accepts signal from the transfer memory Mlb-In and from the operations-oriented coordination task structure level (not shown), whereby the status messages generated by the line technology task DH-T and intended for the operations-oriented coordination task structure level are output to an input and output memory Mlb-SC (for the coordination program module) or to an input and output memory Mlb-FC (for the data file administration program module).

All three operations technology apparatus program modules AMF, AMT, AMS have access to the data base DB of the communications system via the data base access routines DDAR. The interfaces symbolically indicated by the arrows within the line technology task structure level have the following significance in detail:

1:
Pending status message from the operations-oriented coordination structure level to the line technology task DH-T.

2:
Type-associated program activation with interface supply by the line technology task organization program TOP-DH by the type of terminal equipment addressed.

3:
Status message interface within the same type of apparatus program module.

4:

Status message interface to the operations-oriented coordination structure level.

5:

Interface via the memory DP-RAM to the periphery technology.

6:

Status message interface for the operations-oriented coordination structure level (for the data file administration program module).

7:

Interface via the memory DP-RAM from the periphery technology, for example for the acceptance of evaluated results of inquiry processors of the peripheral terminal equipment. The destination memory is the input and output memory Mlb-DH operated mail boxlike.

The selection and administration, for example for depositing apparatus memory addresses, the call-in of transport procedures for the input and output memory Mlb-DH, as well as the centralized enable of the connection memory result from the line technology task organization program TOP-DH.

The execution of an operations-oriented function, considered as a control case via an operations technology terminal T connected to the communications system shall be set forth with reference to FIG. 4 in which the essential structural component parts of the communications system of FIG. 1 are shown again.

The inputs at the terminal T are collected in the operations technology apparatus program module AMT in the line technology task structure level DH and, after receipt of a transmit criterion via the program bus PDM of the program bus structure PDM, LDM, are fowarded to the coordination program module SES CON in the operations-oriented coordination task structure level LDU PD. This transmission of status messages occurs via the interface "1" in the virtual terminal protocol.

The data are then transmitted from the operations-oriented coordination program module SES CON to the text processor program module MMI via the program bus LDM of the program bus structure PDM, LDM, interface "2". The text processor program module MMI calculates the desired application from the transmitted data and outputs appropriate information to the coordination program module SES CON via the interface "2". The coordination program module SES CON forwards information about the desired application program modules AMA via the interface "3" to the application connection program module CNC CON that subsequently makes the application-associated data file tables required for further instruction processing available via the interface "3".

The text processor program module MMI, to which the instructions generated with the use of the application-associated tables are supplied via the interface "2", continues the check operations with these instructions and forwards the data converted from the instruction to the coordination program module SES CON. The coordination program module SES CON communicates a connection request concerning specific application program modules AMA via the interface "3". Via the interface "5" to the application program modules AMA, the application connection program module CNC CON establishes a connection of the desired application program module AMA to the coordination program module SES CON; the coordination program module SES CON forwards the job request data to the application program module AMA in the virtual application protocol via the interface "4".

After program-associated execution of the job request, the application program module AMA reports the corresponding procedure result to the coordination program module CS CON in the virtual application protocol, again via the interface "4", this coordination program module CS CON in turn forwarding these data via the interface "2" to the text processor program module MMI for conversion of the data from the virtual application protocol into the virtual terminal protocol. The conversion result communicated via the interface "2" to the coordination program module SES CON is transmitted from the latter via the interface "1" to the operations technology apparatus program module AMA and is communicated from the latter to the terminal T.

In case certain applications are not resident in the operations-associated application task structure level LDU VD, the application connection program module CNC CON serves the purpose of re-loading appropriate data held at peripheral storage media F via an appropriate apparatus program module AMF in the line technology task structure level DH, via the interface "7" and the data file administration apparatus program module FILE CON or the interface "6" of the software bus LDM.

The status message flow via the interfaces "1" through "5" is shown in FIGS. 5a, 5b, 5c, 5d, 5e. The types of status messages communicated via the interfaces "1" through "5" shall be described below in terms of their significance; the chronological sequence of these different types of status messages may be derived from FIGS. 5a, 5b, 5c, 5d, 5e.

1. Interface "2" Between The Coordination Program Module SES CON and The Text Processor Program Module MMI.

The data are transmitted in the data protocol MMIP (man-machine interpreting protocol). This protocol provides three successive data fields—system field, session field, MMI field—for the data to be transmitted. The following activities are sequenced via this interface:

checking operations-oriented inputs and the terminal equipment and, as warranted, requests for input correction converting the virtual terminal protocol into the virtual application protocol and vice versa initiation of the installation of application program modules and of the loading of data tables initialization of the text processor program module output of information about the lack of data and program resources in the text processor program module.

1.1 Status Messages From The Coordination Program Module SES CON To The Line Technology Task Structure Level DH.

LOGON ACK—acknowledgement in response to the status message "LOGON" (starting an operations-oriented session) This acknowledgement is forwarded to the appertaining operating technology apparatus program module in common with the communication of the session number.

WRITE—output of data to the operating technology terminal equipment; acknowledgement is required.

WRT ONLY—output of data to an operating technology, for example confirmation of the start of a session and transfer of application data head part texts; no acknowledgement is required.

WRT RD—output of data to the operating technology terminal equipment with subsequent request for further inputs.

1.2 Status Messages From The Line Technology Task Structure Level DH To The Coordination Program Module SES CON.

DATA—data transfer of input data.

LOGON—request to start an operations-oriented session; acknowledgement (LOGON ACK) is required.

WRT ACK—acknowledgement in response to the status message WRITE; as warranted, requests for subsequent order texts.

2.1 Status Messages from the Text Processor Program Module MMI to the Coordination Program Module SES CON.

INST AMA—request for the installation of a defined application program module and subsequent transmission of instructions.

LOAD TBLS—request to load application-associated and language-associated text tables and application-associated parameter tables.

WRITE—output of general consideration information to the operations technology terminal.

WRT RD—output of general consideration information to the terminal with subsequent possibility of new inputs.

2.2 Status Messages from the Coordination Program Module SES CON to the Text Processor Program Module MMI.

END WRT—editing a procedure result of an application program module into data in the virtual terminal protocol.

PARS—transmission of input data in the virtual terminal protocol for checking.

PROMPT—request of a new parameter or correction of a prior parameter based on the particulars of an application program module.

WRT RD—request for output of input masks.

3.1 Status Messages from the Application Connection Program Module CNC CON to the Coordination Program Module SES CON.

INST ACK—acknowledgement in response to the status message "INST AMA" (request to load an application code or, respectively, to start a task).

LOAD ACK—acknowledgement for the status message "LOAD TBLS" (tables loaded).

REL ACK—acknowledgement for the offering of tables or application codes.

3.2 Status Messages from the Coordination Program Module SES CON to the Application Connection Program Module CNC CON.

INST AMA—request to load the application code and starting a task.

LOAD TBLS—request to load text and parameter tables.

REL AMA—conditioned enable of an application code.

4.1 Status Messages from the Application Program Module AMA to the Coordination Program Module SES CON.

CND ACC—output of an acknowledgement for the beginning of the application-oriented processing of an operations-oriented request to the input apparatus.

END WRT—output of procedure results to the input apparatus

PROMPT—request for a new parameter or for a parameter correction based on particulars of an application program module.

RES DEV—reserving an output apparatus for continuous output

WRITE—data output to the input apparatus.

4.2 Status Messages from the Coordination Program Module SES CON to the Application Program Module AMA.

RES ACK—acknowledgement for the status message "RES DEV".

START—transfer of a converted input instruction.

WRT ACK—acknowledgement for the status messages "WRITE" and "WRT ONLY".

FIGS. 5a, 5b, 5c, 5d, 5e additionally show the status message flow from and to an operations-oriented printer to which an operations-oriented apparatus program module AM-LP is allocated.

The illustration of the status message flow in FIGS. 5a, 5b, 5c, 5d, 5e is supplemented by comments having the consecutive designation E1, E2 . . . E18. These comments are reproduced below:

E1:
Indication of the designation of the started session.
E2:
Last part of the input request.
E3:
Input to the operations technology terminal equipment.
E4:
Checking the data head part of the input data.
E5:
Command test.
E6:
Requests for input corrections.
E7:
Input to the operations technology terminal equipment.
E8:
Communication that input data are syntax-suited.
E9:
Parameter transfer to an application program module.
E10:
Start of the parameter checking in the application program module.
E11:
Conclusion of the parameter checking.
E12:
Output instruction to the text processor program module.
E13:
Output instruction for the apparatus program module.
E14:
Start of the indication of applications.
E15:
Output messages to the printer.
E16:
Beginning of the continuous printing.
E17:
Acknowledgement about successful reservation.
E18:
Termination of the reservation.
E19:
Indication of the procedure results.
E20:
Report about complete execution of the application-oriented job.

With the output of the status message "WRT ACK" in E20, a new installation of the program execution occurs.

In terms of its hardware structure, the communications system shown in FIG. 6 whose operations-oriented components have been set forth above with reference to FIGS. 1 through 5 is fundamentally subdivided into three hierarchical structure levels. The periphery level essentially serving for connection of terminal equipment and lines is formed by three periphery modules PER1, PER2, PER3 each of which is constructed of a plurality of subscriber terminal assemblies or line terminal assemblies such that a maximum of 64 ports, for example, 32 two-wire line connections, are accessible at the periphery modules PER1 . . . PER3.

For example, the subscriber terminal assemblies can provide connection of analog subscriber terminal equipment. They then usually have one interface means with indication of call and loop closure per terminal equipment to which a respective processor means for analog-to-digital or digital-to-analog conversion and for programmable input impedance or level matching is allocated. One realization of these component parts of a subscriber terminal assembly is disclosed in U.S. Pat. No. 4,381,561. The interface between a maximum of 16 such line-associated equipment and internal communications system PCM connections or HDLC control lines (high level data link control) is formed by an assembly processor control that can, for example, correspond in terms of structure and functioning to the processor disclosed by U.S. Pat. No. 4,694,452. Further details about the function of this processor are disclosed in the product publication of Siemens AG, PBC Peripheral Board Controller PEB2050 (SM 205) Preliminary Technical Description (Part 1), ordering number B/2684-101. The coordination control of the assembly processor control is provided by a microprocessor that can be an integral component part of every subscriber terminal assembly. The job of the coordination control, however, can also be assumed by an input/output processor, for example IOP1, allocated to the respective subscriber terminal assembly.

Other terminal assemblies for, for example, digital or ISDN equipment or links can be provided in each of the periphery modules PER1, PER2, PER3 either alone, additionally or in combination.

The module processor controls, essentially formed by assembly processor controls, and at least one microprocessor serving for the coordination thereof each administer two PCM-structured connections (PCM highways) PCM2, PCM3; PCM4, PCM5; PCM6, PCM7 and a respective, doubly directed connection for the transfer and acceptance of control information that are transmitted in the standardized data transmission procedure HDLC. A further periphery module PERO supplies the communications system with call progress tones, announcements and music during the hold status of connections. The additional periphery module PERO also contains audible character receivers, transmission and reception devices for selection characters transmitted in multi-frequency code procedure as well as test transmitters and test receivers. The additional periphery module PERO, similar to the periphery modules PER1, PER2, PER3, is connected via two PCM highways PCMO, PCMI as well as via an information transmission link HDLCO.

The structure of the additional periphery module PERO is shown in FIG. 8 and shall be described later.

The next structure level of the digital communications system is formed by a total of four (control information) communications modules HDLC-CO, HDLC-C1, HDLC-C2, HDLC-C3 (HDLC controllers) as well as by two input/output processors IOP1, IOP2, the input/output processor IOP1 being allocated to the two communications modules HDLC-C0 and HDLC-C1 but the input/output processor IOP2 being allocated to the communications modules HDLC-C2, HDLC-C3.

Since the HDLC standard is used for the exchange of data, instructions and status messages in many applicable, practically realized systems, corresponding control information communications modules ar implemented in the form of integrated circuits; the communications system shown in FIG. 1 uses these modules (HDLC controllers) in the standard way, so that no hardware or software adaptations are needed for the utilization of these modules in the communications system. In the framework of the communications system of the present invention, the block check field in the data transmission blocks defined in the HDLC standard is of particular significance since the block check character string transmitted in this field enables an error-protected forwarding of control information.

A digital switching matrix network module MTS to which all PCM highways PCM0, PCM1 . . . PCM14, PCM15 are connected also belongs in the same structure level as the (control information) communication modules HDLC-CO . . . HDLC-C3. The digital switching matrix network module is implemented for example. with an integrated circuit PEB 2040 of Siemens AG. Structure and functioning of a digital switching matrix network module are disclosed, for example, by U.S. Pat. No. 3,678,206.

A conference network CON that is connected to the digital switching matrix network module MTS with two further PCM highways PCM8. PCM9 is likewise connected into the structure level of the communication modules HDLC-C0 . . . HDLC-C3 and of the digital switching matrix network module MTS. A possible realization of the conference network CON is disclosed by U.S. Pat. No. 4,054,757.

Just the like the two input/output processors IOP1, IOP2, the digital switching matrix network module MTS and the conference network CON are connected to a local multiplex bus LB that represents the interface to the hierarchically highest structure level of the digital communications system. This structure level is formed by a central control processor DP that administers the system data base DB, the program bus structure PDM, LDM and at least most of the program modules, particularly CP and SES CON (see FIG. 1 and the appertaining description), and that coordinates the collaboration of all assemblies and modules of the communications system. Significant functions of the central control processor are thus the storage and request-suited running of exchange-oriented programs and, toward the periphery, the control and monitoring of the local bus LB. Additional, standard functions of the central control processor are operations-oriented executions, reliability-oriented displays as well as clock generatings.

It may be seen from the schematic illustration of FIG. 7 that the central control processor DP, as shown in FIG. 1, has a microprocessor $\mu$PO which is preceded by an access controller ACO. Incoming and outgoing control information C, data information D and address information A are present at this access controller ACO. The microprocessor μPO has an internal memory MEMO allocated to it that, for example, has a memory capacity of about 1500K byte.

A clock generator CL-GEN is provided for the synchronization of the overall switching control with the transfer clocks on the PCM lines, this clock generator CL-GEN outputting clock pulses to the periphery level of the communications system via an adapted driver circuit DR.

The central control processor DP is connected to the multiplex bus LB, as shown in FIG. 1, by an interface controller IFO, this multiplex bus LB, among other things, representing the connection to the input/output processors IOP1, IOP2.

In a fashion similar to that of the central control processor DP, the microprocessor IOP1, and, in the same way, the input/output processor IOP2, is equipped with a microprocessor μP1 to which an internal memory MEM1 is allocated. This memory MEM1 is a dual port RAM and consequently has an interface DPC that enables a simultaneous roll-out and roll-in.

Control information C, data information D and address information A are exchanged in the direction toward the periphery with two allocated communications modules HDLC-C (not shown). In the direction toward the central control processor, an interface circuit IF1 interfaces with the adaptation to the multiplex bus LB.

The input/output processors IOP1, IOP2 assist the central control processor DP in running time-critical jobs. Important functions of the input/output processors IOP1, IOP2 are the polling of the terminal assemblies the control of the information outgoing to lines or subscribers via the terminal assemblies, outputing numerals and clocking tones and calls.

FIG. 8 shows the essential component parts of the further periphery module PERO contained in FIG. 6. Based on the illustration of FIG. 6, the two PCM highways that lead to the digital switching matrix network are referenced PCM0 and PCM1. Likewise based on the illustration in FIG. 6, the transmission channel to a control information communications module is referenced HDLCO.

Both the PCM highways PCM0, PCM1 as well as the transmission channel HDLCO represent connections of a processor PBC (peripheral board controller). The processor PBC is preferably realized with the same module as the assembly processors. A further connection level of the processor PBC is in communication with a total of 8 signal processors μPO0, μPO1 . . . μPO7 to which different functions are assigned. The signal processors μPO0, μPO1 . . . μPO7, for example, function as code receivers and code transmitters for selection characters utilized in the multi-frequency code method, serve for generating call tones and announcements as well as for transmitting and receiving test signals.

The signal processors μPO0, μPO1 . . . μPO7 as well as the processor PBC have a memory RAM for programs and data allocated to them. The processor PBC accesses a bus structure via its terminal B, the memory RAM and a module processor μP being connected to this bus structure in addition to the signal processors μPO0, μPO1 . . . μPO7.

Further outputs of the processor PBC connected to the communications system serve for the acceptance of the PCM clock (2.048M hz) CKA and of a frame synchronization clock of 8 kHz-FMB. A peripheral reset signal with which a defined initial status of the further periphery module PERO can be set is supplied via the terminal PRS.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed:

1. A modularly structured digital communications system for connecting terminal equipment to one another and to, public networks, which contained:

a central system computer having a system data base and at least one multi-tasking operating system, comprising:

means for the administration of a line technology task structure having operating technique apparatus program modules for interfacing with types of terminal equipment for generating logical operating technology status messages from inputs receive from at least one of the terminal equipment and operating technology terminal equipment and for outputting setting data for the terminal equipment and/or operating technology terminal equipment that are acquired from logical operating technology status messages associated with apparatus type, and means for administering an operations-oriented coordination task structure hierarchically equivalent to a switching technology task structure and having a coordination program module for the control of the operations-oriented information and data flow, said coordination program module being hierarchically lower-ranking than a coordination task organization program, and means for administering an operations-oriented application task structure having at least one application program module for executing application-oriented functions, such as initialization, maintenance, and remote control technology, said at least one application program module being hierarchically lower-ranking than an application task organization program, whereby at least one part of the program modules is individually accessible to the data base via defined data base access routines, the multi-tasking operating system having a program bus structure having a first transmission protocol, that is a virtual terminal protocol, defined independently of the type of communication services and terminal equipment for status messages transmitted between the line technology task structure and the coordination task structure and having a second transmission protocol, that is a virtual application protocol, likewise defined independently of the communications services and the type of terminal equipment which provides compact data arrangement that is at least approximately free of control characters for status messages transmitted inside the application task structure and between the latter and the coordination task structure, and a text processor program module for converting status messages in one of the two transmission protocols into status messages in the other transmission protocol;

the operating technique apparatus program modules operatively connected to at least one of the program bus structure, the terminal equipment and the operating technology terminal equipment;

the coordination program module operatively connected to at least the program bus structure;

the at least one application program module operatively connected to at least the program bus structure; and the text processor program module operatively connected to at least the program bus structure.

2. The communications system according to claim 1 wherein the text processor program module is inserted into the operations-oriented application task structure.

3. The communications system according to claim 1, wherein a data file administration program module for controlling access to peripheral data files is inserted into the operations-oriented coordination task structure, said data administration program module being hierarchically lower-ranking than a data file administration task organization program.

4. The communications system according to claim 3, wherein a memory program module for controlling search, read and write jobs for memories accepting the data files is inserted into the line technology task structure.

5. The communications system according to claim 4, wherein the memory program module is structured such that it constructs and dismantles waiting lists for search, read and write jobs initiated by the data file administration program module.

6. The communications system according to claim 1, wherein the coordination program module is structured such that it initiates the selection of the appropriate application program module dependent on the type of application addressed within an operations-oriented job.

7. The communications system according to claim 6, wherein the coordination program module administers memory locations allocated to the program module for the acceptance of data transferred in individual, operations-oriented sessions.

8. The communications system according to claim 6, wherein the coordination program module is structured such that it sequences data outputs to at least one of terminal equipment and operating technology terminal equipment upon consideration of priorities of at least one of the data and, of the terminal equipment and the operating technology terminal equipment.

9. The communications system according to claim 6, wherein an application connection program module for setting up and for administering the connection of the coordination program module to one of the application program modules is inserted into the operations-oriented application task structure, said application connection program module being hierarchically lower-ranking than an application connection task organization program.

10. The communications system according to claim 9, wherein the application connection program module is structured such that it checks the presence of defined application program modules in the operations-oriented application task structure.

11. The communications system according to claim 9, wherein the application connection program module is structured such that application program modules not resident in the application task structure are loadable into the application task structure from peripheral data files upon involvement of the data file administration program module and of the memory program module.

12. The communications system according to claim 1, wherein a traffic data acquisition program module for the acquisition of subscriber-oriented or communications-service-oriented connection information is inserted into the operations-oriented application task structure.

13. The communications system according to claim 12, wherein the connection information from at least one switching technology program module inserted into the switching technology task structure are forwarded to the traffic data acquisition program module in the form of status messages of a switching technology-oriented status message protocol based on defined switching procedure sections.

14. The communications system according to claim 9, wherein an operations-oriented job is executed on the basis of inputs from the operating technology terminal equipment that, following acceptance of the input data by the operating technology apparatus program module allocated to the operating technology terminal equipment and after following reception of a transmission criterion transmitted via a program bus of the program bus structure, the input data are forwarded via the program bus to the coordination program module structured according to the virtual terminal protocol, said coordination program module forwarding the input data to the text processor program module for checking which application program module is required for further processing and outputting a status message dependent on the result of this check to the application connection program module for the purpose of requesting application-associated tables required for job handling.

15. The communications system according to claim 14, wherein the coordination program module accepts the job data converted by the text processor program module and outputs them to the selected application program module via a connection set up by the application connection program module, said selected application program module forwarding the procedure result in the virtual application protocol to the coordination program module after running the application-associated procedures.

16. The communications system according to claim 1. wherein the text processor program module is inserted into an operating technology terminal equipment realized by a personal computer in which data tables associated with the individual applications are stored, these data tables being involved in the handling of operations-oriented jobs by a system program of the operating technology terminal equipment that is functionally structured like the coordination program module.

17. The communications system according to claim 16, wherein the remaining data traffic between the operating technology terminal equipment and the coordination program module occurs according to the virtual application protocol, for at least checking job-typical parameters against the data base.

18. The communications system according to claim 1, wherein only data modified in comparison to a status underlying a previous status message are transmitted in the status messages in the virtual terminal protocol.

19. The communications system according to claim 1, wherein the status messages in the virtual terminal protocol and in the virtual application protocol are constructed such that a system data head part having a defined sequence of message originating and message destination addresses is followed by an operations-oriented-associated data head part having a protocol identification that is different for the two protocols, having a designation of a job session to which the respective status message belongs and having a destination address indicating the application program module needed for handling the job session.

20. The communications system according to claim 1, wherein the operating technology apparatus program modules allocated to the terminal equipment and those allocated to the operating technology terminal equipment have a pre-processing program level that evaluates signals output by the terminal equipment and the operating technology terminal equipment according to individual line criteria and that converts status messages from the operations-oriented task structure into setting data for the terminal equipment and the operating technology terminal equipment and have an evaluation program level that converts the signals into protocol-suited status messages on the basis of system-associated parameters.

21. The communications system according to claim 20, wherein at least one of the operating technology apparatus program modules allocated to the terminal equipment represents a sub-module of an apparatus program module which interfaces with the type of terminal equipment that has a further sub-module for processing switching-oriented signals and status messages; and wherein an allocation program resident in the evaluation program level branches status messages and information to the two sub-modules.

22. The communications system according to claim 21, wherein the terminal equipment, such as the telephone terminal equipment, has an alpha-numerical display means, such as a display, having a limited display capacity in comparison to a picture screen device; and wherein the sub-module allocated to the operating technology is designed such that the communication of texts to be displayed at the alpha-numerical display means occurs field-by-field with a field size adapted to the display capacity.

23. The communications system according to claim 1, wherein a periphery memory controlled by an input/output processor has an input terminal for status messages for the terminal equipment and the operating technology terminal equipment that are acquired in the line technology task, and has an output terminal for status messages acquired from signals of the terminal equipment and the operating technology terminal equipment, said input and output terminal being controllable independently of one another.

24. The communications system according to claim 23, wherein input and output transfer memories operated mailbox-like are allocated both to the input terminal as well as to the output terminal, respectively.

25. The communications system according to claim 24, wherein the operating technology apparatus program modules of the line technology task are linked to the output transfer memory for the status messages to be output to the terminal equipment and to the operating technology terminal equipment.

26. The communications system according to claim 24, wherein the communication of the signals and information initiated by the terminal equipment and the operating technology terminal equipment from the input transfer memory and output memory of the line technology task and from the apparatus program modules to the output transfer memory for the status messages to be output to the terminal equipment and the operating technology terminal equipment occurs in a transport slice of a status message protocol of the multi-tasking operating system.

27. The communications system according to claim 23, wherein the input/output processor is equipped with an operating system identical to the multi-tasking operating system.

28. The communications system according to claim 1, wherein the line technology task structure, the operations-oriented coordination task structure and the operations-oriented application task structure each have at least one input and output memory operated mailbox-like allocated to it.

29. A modularly structured digital communications system for connecting terminal equipment to one another and to public networks having a central system computer with a system data base and at least one multi-tasking operating system, comprising means for the administration of a line technology task structure having operating technique apparatus program modules for interfacing with types of terminal equipment for generating logical operating technology status messages from inputs received from at least one of the terminal equipment and operating technology terminal equipment and for outputting setting data for the terminal equipment and/or operating technology terminal equipment that are acquired from logical operating technology status messages associated with apparatus type, and means for administering an operations-oriented coordination task structure hierarchically equivalent to a switching technology task structure and having a coordination program module for the control of the operations-oriented information and data flow, said coordination program module being hierarchically lower-ranking than a coordinating task organization program, and means for administering an operations-oriented application task structure having at least one application program module for executing application-oriented functions, such as initialization, maintenance, and remote control technology, said at least one application program module being hierarchically lower-ranking than an application task organization program, comprising:

at least one part of the program modules individually accessible to the data base via data base access routines, the multi-tasking operating system having a program bus structure having a first transmission protocol, that is a virtual terminal protocol, defined independently of the type of communication services and terminal equipment for status messages transmitted between the line technology task structure and the coordination task structure and having a second transmission protocol, that is a virtual application protocol, likewise defined independently of the communications services and the type of terminal equipment which provides compact data arrangement that is at least approximately free of control characters for status messages transmitted inside the application task structure and between the latter and the coordination task structure;

a text processor program module for converting status messages in one of the two transmission protocols into status messages in the other transmission protocol;

the operating technology apparatus program modules allocated to the terminal equipment and those allocated to the operating technology terminal equipment having a pre-processing program level that evaluates signals output by the terminal equipment and the operating technology terminal equipment according to individual line criteria and that converts status messages from the operations-oriented task structure into setting data for the terminal equipment and the operating technology terminal equipment and having an evaluation program level that converts the signals into protocol-suited status messages on the basis of system-associated parameters;

at least one of the operating technology apparatus program modules allocated to the terminal equipment representing a sub-module of an apparatus program module which interfaces with the type of terminal equipment that has a further sub-module for processing switching-oriented signals and status messages; and wherein an allocation program resident in the evaluation program level branches status messages and information to the two sub-modules;

the operating technique apparatus program modules operatively connected to at least one of the program bus structure, the terminal equipment and the operating technology terminal equipment;

the coordination program module operatively connected to at least the program bus structure;

the at least one application program module operatively connected to at least the program bus structure; and the text processor program module operatively connected to at least the program bus structure.

30. The communications system according to claim 29, wherein the terminal equipment has an alpha-numerical display means having a limited display capacity in comparison to a picture screen device; and wherein the sub-module allocated to the operating technology is designed such that the communication of texts to be displayed at the alpha-numerical display means occurs field-by-field with a field size adapted to the display capacity.

31. A modularly structure digital communications system for connecting terminal equipment to one another and to public networks having a central system computer with a system data base and at least one multi-tasking operating system, comprising means for the administration of a line technology task structure having operating technique apparatus program modules for interfacing with types of terminal equipment for generating logical operating technology status messages from inputs received from at least one of the terminal equipment and operating technology terminal equipment and for outputting setting data for the terminal equipment and/or operating technology terminal equipment that are acquired from logical operating technology status messages associated with apparatus type, and means for administering an operations-oriented coordination task structure hierarchically equivalent to a switching technology task structure and having a coordination program module for the control of the operations-oriented information and data flow said coordination program module being hierarchically lower-ranking than a coordination task organization program, and means for administering an operations-oriented application task structure having at least one application program module for executing application-oriented functions, such as initialization, maintenance, and remote control technology, said at least one application program module being hierarchically lower-ranking than an application task organization program, comprising:

at least one part of the program modules individually accessible to the data base via data base access routines, the multi-tasking operating system having a program bus structure having a first transmission protocol, that is a virtual terminal protocol, defined independently of the type of communication services and terminal equipment for status messages transmitted between the line technology task structure and the coordination task structure and having a second transmission protocol, that is a virtual application protocol, likewise defined independently of the communications services and the type of terminal equipment which provides compact data arrangement that is at least approximately free of control characters for status messages transmitted inside the application task structure and between the latter and the coordination task structure;

a text processor program module for converting status messages in one of the two transmission protocols into status messages in the other transmission protocol;

the operating technology apparatus program modules allocated to the terminal equipment and those allocated to the operating technology terminal equipment having a pre-processing program level that evaluates signals output by the terminal equipment and the operating technology terminal equipment according to individual line criteria and that converts status messages from the operations-oriented task structure into setting data for the terminal equipment and the operating technology terminal equipment and having an evaluation program level that converts the signals into protocol-suited status messages on the basis of system-associated parameters;

at least one of the operating technology apparatus program modules allocated to the terminal equipment representing a sub-module of an apparatus program module which interfaces with the type of terminal equipment that has a further sub-module for processing switching-oriented signals and status messages; and wherein an allocation program resident in the evaluation program level branches status messages and information to the two sub-modules;

a periphery memory administered by an input-output processor having an input terminal for status messages for the terminal equipment and the operating technology terminal equipment that are acquired in the line technology task, and having an output terminal for status messages acquired from signals of the terminal equipment and the operating technology terminal equipment, said input and output terminal being controllable independently of one another;

input and output transfer memories operated mailbox-like and allocated both to the input terminal as well as to the output terminal, respectively;

the communication of the signals and information initiated by the terminal equipment and the operating technology terminal equipment from the input transfer memory and output memory of the line technology task and from the apparatus program modules to the output transfer memory for the status messages to be output to the terminal equipment and the operating technology terminal equipment occuring in a transport slice of a status message protocol of the multitasking operating system;

the operating technique apparatus program modules operatively connected to at least one of the program bus structure, the terminal equipment and the operating technology terminal equipment;

the coordination program module operatively connected to at least the program bus structure;

the at least one application program module operatively connected to at least the program bus structure; and the text processor program module operatively connected to at least the program bus structure.

* * * * *